(12) United States Patent
Reid et al.

(10) Patent No.: US 7,100,752 B2
(45) Date of Patent: Sep. 5, 2006

(54) BRIDGE PIER CRASH CUSHION SYSTEM

(75) Inventors: John D. Reid, Lincoln, NE (US); John R. Rohde, Lincoln, NE (US); Dean L. Sicking, Lincoln, NE (US); King K. Mak, San Antonio, TX (US)

(73) Assignee: Safety By Design Co., Lincoln, NE (US)

( * ) Notice: Subject to any disclaimer, the term of this patent is extended or adjusted under 35 U.S.C. 154(b) by 0 days.

(21) Appl. No.: 10/933,045

(22) Filed: Sep. 2, 2004

(65) Prior Publication Data
US 2005/0023095 A1 Feb. 3, 2005

(51) Int. Cl.
E01F 13/00 (2006.01)

(52) U.S. Cl. ............ 188/371; 188/377; 256/13.1; 404/6

(58) Field of Classification Search ........ 188/372–377; 256/13.1; 114/219; 405/212, 215; 267/116; 404/6, 11
See application file for complete search history.

(56) References Cited

U.S. PATENT DOCUMENTS

| | | | | |
|---|---|---|---|---|
| 3,672,657 A | * | 6/1972 | Young et al. ............... 267/116 |
| 3,674,115 A | * | 7/1972 | Young et al. ................ 404/6 |
| 3,779,192 A | * | 12/1973 | Gonzalez ................ 114/266 |
| 3,933,111 A | * | 1/1976 | von Bose et al. .......... 405/212 |
| 3,981,486 A | * | 9/1976 | Baumann .................. 256/13.1 |
| 4,009,676 A | * | 3/1977 | Kura ........................ 114/78 |
| 4,338,046 A | * | 7/1982 | Thomerson ............... 405/212 |
| 4,655,434 A | * | 4/1987 | Bronstad .................. 256/13.1 |
| 4,674,911 A | * | 6/1987 | Gertz ......................... 404/6 |
| 4,804,296 A | * | 2/1989 | Smath ....................... 405/212 |
| 4,884,919 A | * | 12/1989 | Moore ....................... 405/212 |
| 5,022,782 A | * | 6/1991 | Gertz et al. ................... 404/6 |
| 5,391,016 A | * | 2/1995 | Ivey et al. .................... 404/6 |
| 6,505,820 B1 | * | 1/2003 | Sicking et al. ............. 256/13.1 |
| 6,536,985 B1 | * | 3/2003 | Albritton ...................... 404/6 |
| 6,715,735 B1 | * | 4/2004 | Bligh et al. ................. 256/13.1 |

* cited by examiner

Primary Examiner—Christopher P. Schwartz
(74) Attorney, Agent, or Firm—Jackson Walker, LLP (57) ABSTRACT

A crash cushion system to envelop at least one bridge pier. The system has two impact heads, one facing one traffic flow direction and the other facing an opposite traffic flow direction. The heads are connected to multi-stage box beam energy absorbers which are in turn connected to a tubular frame structure which envelops the bridge piers. The frame is spaced apart from the face of the pier sufficiently to avoid an impacting vehicle's snagging the frame and contacting the pier structure. Anchorage cables to stiffen and support the sides of the envelope are positioned inside the frame's parallelogram shape.

9 Claims, 8 Drawing Sheets

BRIDGE PIER CRASH CUSHION SYSTEM

This invention was made in part during work supported by a grant/contract Contract No. DTR557-98-C-00079 from DOT/RSPA/Volpe National Transportation System Center. The government may have certain rights in this invention.

BACKGROUND OF THE INVENTION

The present invention relates to a traffic crash attenuation system or crash cushion system. More particularly, the present invention relates to a system, method and apparatus for absorbing kinetic energy from an impacting vehicle in a controlled and safe manner. The system is used with roadside safety devices such as guardrails and median barrier end treatments. Even more specifically, the present invention is a system applied to shield bridge piers in the median of divided highways.

Current safety treatments at bridge pier sites include installation of guard rails on each side of the piers to form an envelope with W-beam bullnose ends. In some applications, crash cushions are installed on the two ends of the pier configuration with concrete walls constructed in the spaces between adjacent piers.

The present system consists of two energy-absorbing crash cushions combined with a tubular frame or structure to envelop the bridge piers. The crash cushions provide protection for end-on impacts while the tubular side structure shields the bridge piers from oblique impacts by errant vehicles. The tubular structure around the bridge piers is modular in nature and can be adjusted to accommodate different number, size, and spacing of bridge piers. The energy-absorbing capabilities of this new crash cushion are based on tube bursting technology described in U.S. Pat. Nos. 6,308,809 and 6,437,570 and incorporated herein by reference. This basic "guardrail envelope" treatment has some limitations which the present invention addresses.

Initial testing of prototypes of the present invention indicated snagging of the engine hood and the left-front fender on the upstream side of the bridge pier, thus causing the engine hood to be pushed backward and into the base of the windshield. This engine hood to windshield contact resulted in noticeable damage to the windshield. Based on the engine hood snag and resulting windshield damage, there was a potential for penetration of the occupant compartment during impact. The present invention avoids the hazards posed by interaction of vehicles with the bridge piers. This has been evidenced by crash testing utilizing a pickup truck weighing approximately 2,000 Kg impacting the present invention system at a speed of 100 km/h and at an angle of 25 degrees at the critical impact point (CIP) of the system.

Testing revealed that there must be sufficient space between the guardrail side structure and the adjacent face of any of the bridge piers to allow for the dynamic deflection of the guardrail. Without this space, an impacting vehicle may reach and impact the pier. An excessive space between the guardrail side structure and the pier, such as may occur when the guardrail is installed on a sloping grade away from the pier, may adversely effect the performance of the guardrail.

The present invention solves these problems of protecting vehicles from impacting bridge piers.

DETAILED DESCRIPTION OF THE PREFERRED EMBODIMENT

The tube bursting concept, as previously described in U.S. Pat. Nos. 6,308,809 and 6,437,570, operates on the principal that the energy associated with the initiation and propagation of cracks along the length of a tube can be carefully controlled and utilized to dissipate the energy of an impacting vehicle. This concept incorporates a tapered mandrel that is forced inside a tube of slightly smaller dimensions. As the tapered mandrel is forced inside the tube, hoop stresses develop in the tube, and these stresses then initiate and propagate cracks along the length of the tube. The cracks propagate in front of the mandrel such that there is no direct contact between the mandrel and the crack surfaces, thereby limiting friction.

When the crash cushion is impacted end-on by an errant vehicle, the impact head engages and interlocks mechanically with the front of the vehicle. As the vehicle proceeds forward, the impact head is pushed forward along the box-beam rail element. The impact head then contacts the post breaker beam and breaks off the first (end) steel breakaway post, thus releasing the cable anchorage. Shortly after the fracture of the first (end) post, the tapered mandrel contacts the end of the stage one energy-absorbing tube and is forced inside the tube. Cracks are initiated at the corners of the tube, the locations of which are controlled by notches cut into the end of the tube. As the vehicle proceeds forward and pushes the impact head into the tube, the cracks continue to propagate in front of the impact head until a) the vehicle comes to a controlled and safe stop; b) the vehicle yaws away and loses contact with the tubes; or c) the entire length of the stage one tube is used up.

Upon complete bursting of the stage one energy-absorbing tube, the process is repeated with the stage two energy-absorbing tube until, again, a) the vehicle comes to a controlled and safe stop; b) the vehicle yaws away and loses contact with the tube/terminal; or c) the stage two tube is used up.

For impacts that are end-on but at an angle, bursting of the tubular rail element proceeds until the vehicle yaws out and/or buckles the rail element and gates behind the crash cushion. Similarly, for impacts near the end of the crash cushion (e.g., between post nos. 1 and 2), the impacting vehicle breaks off the end post, buckles the rail element, and gates behind the crash cushion.

For impacts into the side of the crash cushion downstream of the beginning of the length-of-need (selected to be post no. 3 or 2.9 m (9 ft-6 in.) from the end of the crash cushion), the crash cushion contains and redirects the impacting vehicle. The cable attachment provides the necessary anchorage to resist the tensile forces acting on the rail element to contain and redirect the vehicle.

As will be described further below, for impacts into the side of the tubular frame shielding the bridge piers in the present inventive system, the tubular frame contains and redirects the impacting vehicle. Anchorage for the tubular frame is provided by two cable anchorage mechanisms, one on each side of the frame. In addition, the tubular frame is stiffened by a double rail, a reduced post spacing around the bridge piers, and diagonal end struts.

Figure 1A:
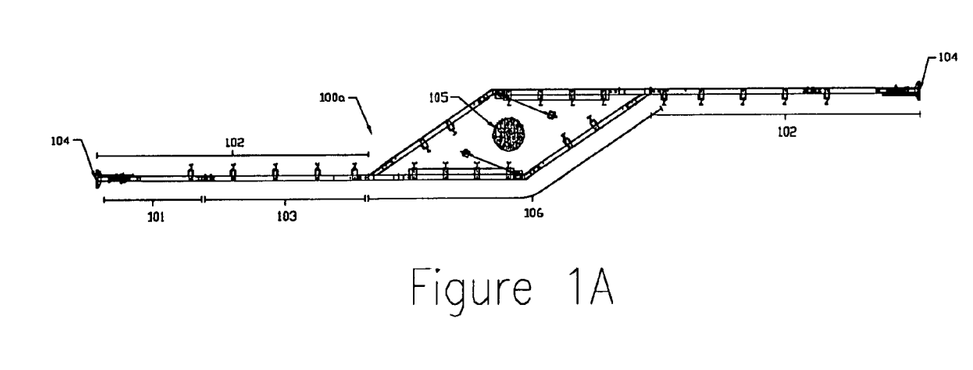
FIG. 1A illustrates a top plan view of the present invention in a typical, single cylindrical, bridge pier configuration.
Figure 1B:
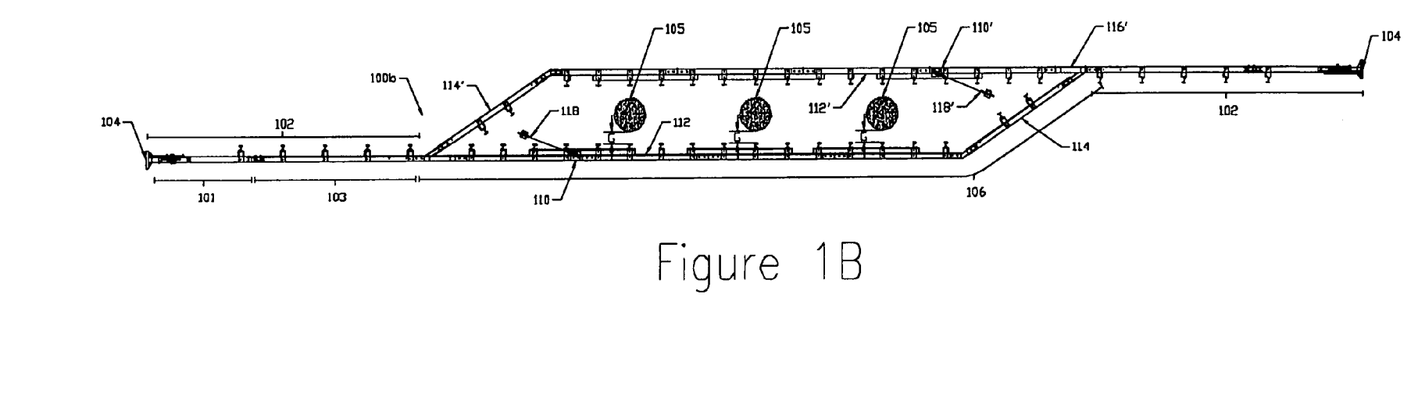
FIG. 1B shows a top plan view of the present invention in a typical, multiple cylindirical, bridge pier configuration.

Turning to the figures, the present inventive crash cushion system is shown generally in several configurations. FIGS. 1A and 1B illustrate the application of the guardrail envelope of the present invention, with a typical single pier (FIG. 1A) configuration 100a and a typical multiple pier (FIG. 1B) configuration 100b. In FIGS. 1A and 1B, the piers 105 are cylindrical. Each configuration discloses two energy-absorbing crash cushions 102 combined with a modular, tubular envelope structure 106 around the bridge pier(s) 105.

Figure 2A:
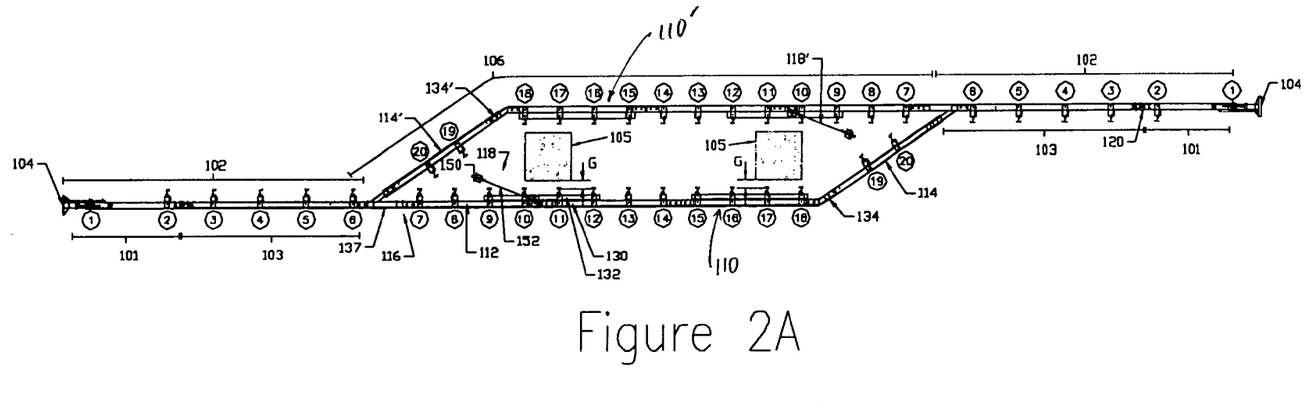
FIG. 2A shows a crash cushion system of the present invention in a top plan view with two rectangular bridge piers.
Figure 2B:
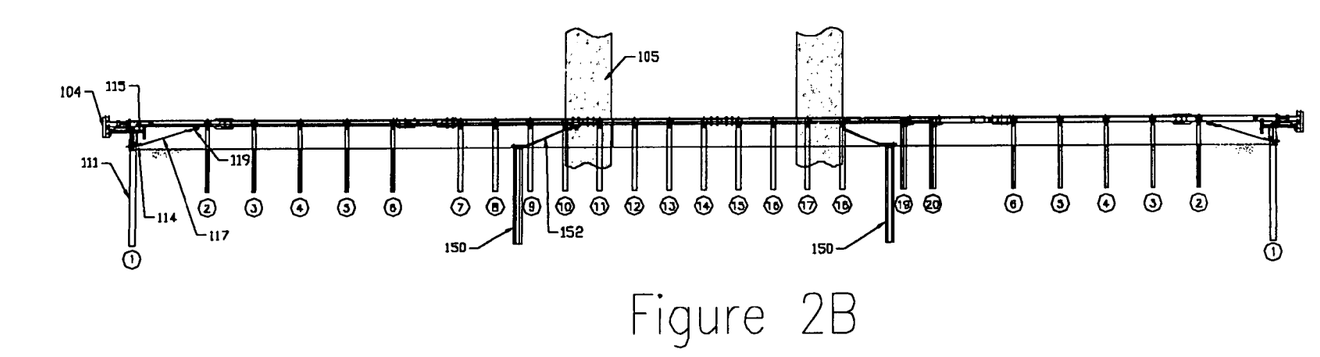
FIG. 2B illustrates a side elevational view of the system of FIG. 2A.

FIGS. 2A and 2B show a cushion system of the present invention enveloping two rectangular concrete bridge piers 105. The cushion system of FIGS. 2A and 2B is approximately 7.9 m (26 ft) in length from the nose of the impact head 104 to the end of the stage two energy-absorbing tube 103 where the crash cushion connects to the tubular frame for the bridge piers. The major components of the crash cushion system are as follows:

(a) an impact head assembly 104;
(b) a 2438-mm (8-ft) long section of 152-mm×152-mm× 3.2-mm (6-in.×6-in.×⅛-in.) box-beam rail for the stage one energy absorber 101;
(c) a 4940-mm (16-ft 2½-in) long section of 152-mm× 152-mm×4.8-mm(6-in.×6-in×³⁄₁₆-in) box-beam rail for the stage two energy absorber 103;
(d) a steel breakaway end post 111;
(e) five steel breakaway posts 2 through 6;
(f) a cable anchorage system 114;
(g) a post breaker 115 attached to the end post 111; and
(h) a restraining cable 122 (See FIG. 6).

The impact head assembly as fully described in the aforementioned patents includes: a front impact plate, a mandrel tube that inserts into the energy-absorbing tube, and a tapered mandrel. The front impact plate has a dimension of 508×508 mm (20×20 in.) with 51-mm (2-in.) wide protruded edges to provide a mechanical interlock with the impacting vehicle and to distribute the impact load. The mandrel tube may be fabricated from a 1168-mm (46-in.) long section of 114-mm×114-mm×4.8-mm (4½-in.×4½-in.×³⁄₁₆-in.) tube. The upstream end of the mandrel tube may be welded to the back of the impact plate. The downstream end of the mandrel tube is inserted into the stage one energy-absorbing tube 101 for a distance of approximately 559 mm (22 in.). A tapered end is formed on the downstream end of the mandrel tube by welding 9.5-mm (⅜-in.) thick bent plates to the end, which acts like a plunger to shear off bolts at connections to the posts and at splices. Two sets of 12.7-mm (½-in) thick straps are welded around the mandrel tube to control the clearance of the mandrel tube within the energy-absorbing tube) and the second set approximately 559 mm (22 in.) upstream from the plunger end. The cross-sectional dimension of the mandrel increases from 114 mm×114 mm (4½ in.×4½ in.) to a maximum of 168 mm×168 mm (6.6 in.×6.6 in.). The inside dimensions of the energy-absorbing tube is 146 mm×146 mm (5¾ in.×5¾ in.).

The stage one energy-absorbing tube 101 is approximately a 2438-mm (8-ft) long section of 152-mm×152-mm× 3.2-mm (6-in.×6-in.×⅛-in.) box-beam rail. A cable anchor bracket 119 for one end of the anchor cable 117 is welded to the bottom of the rail. The cable anchor bracket consists of a 12.7-mm (½-in.) thick plate with a 29-mm (1⅛-in.) diameter hole for the cable anchor and reinforced with gussets. Two 64-mm×64-mm×6.4 mm (2.5-in.×2–5-in.×¼-in.) angles are welded 51 mm (2 in.) upstream from the downstream end of the tube for connection to the standard box-beam rail section. The stage two energy-absorbing tube 103 is approximately a 4940-mm (16-ft 2½-in). long section of 152-mm×152-mm×4.8-mm (6-in.×6-in.×³⁄₁₆-in.) box-beam rail.

Figure 3A:
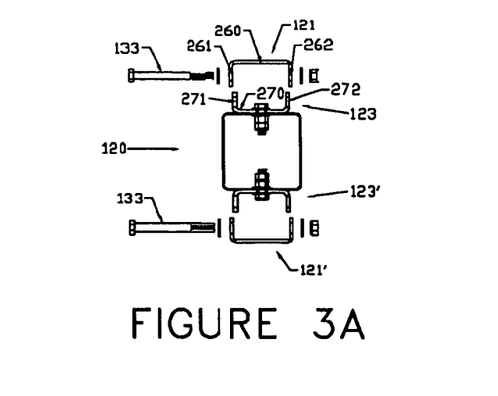
FIG. 3A is an exploded end elevation view of the partially assembled splice mechanism for connection of stage one and stage 2 box-beam energy-absorbing tubes of the present invention.
Figure 3B:
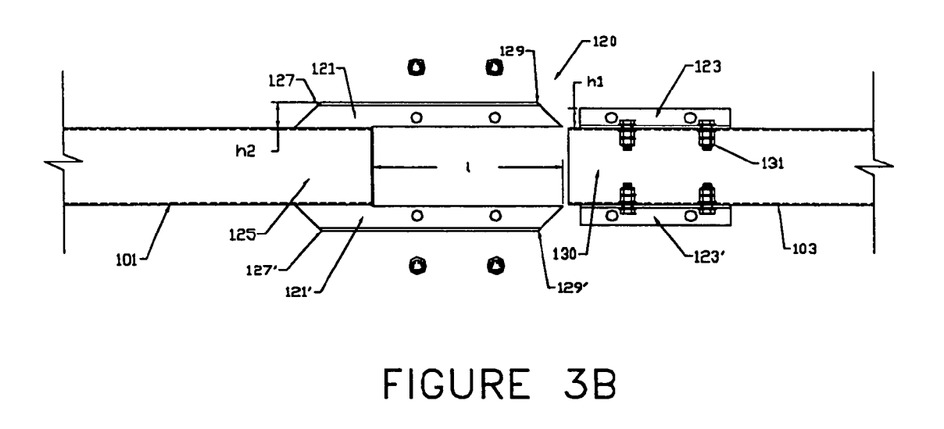
FIG. 3B is an exploded side elevation view of the splice mechanism of FIG. 3A.
Figure 3C:
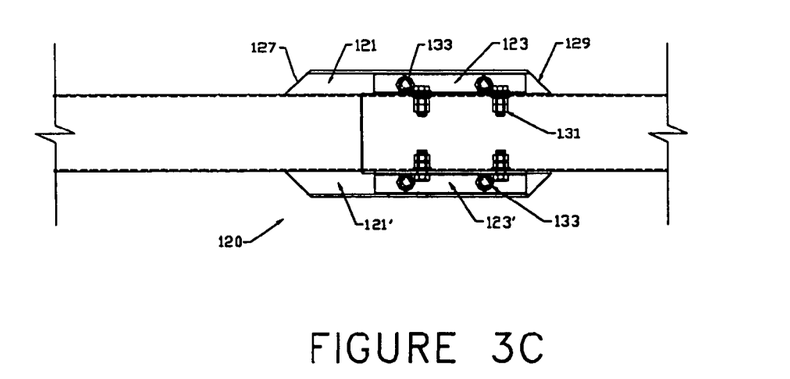
FIG. 3C is a side elevation view of the splice mechanism in its assembled form.

FIGS. 3A–3C illustrate a unique splice mechanism 120 used to connect the one box-beam rail to a second rail.

Figure 3D:
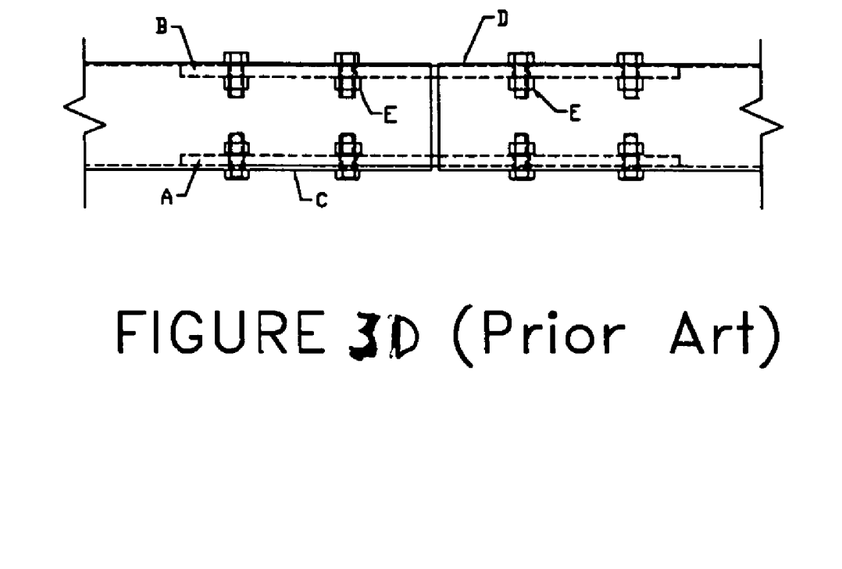
FIG. 3D illustrates a prior art standard splice mechanism for box-beam guardrails and terminal systems.

Presently, the standard splice mechanism (FIG. 3D) for a box-beam guardrail system consists of two plates (A and B) bolted to the inside of the bottom and top of the separate box-beam rails (C and D). FIG. 3D illustrates such prior art splice mechanism. This splice design is not suitable for use with BEAT applications. In order for the bursting process to continue through a splice, it is necessary to shear off the splice bolts and release the splice plates in advance of the mandrel. The energy and the associated force level required to shear off all eight splice bolts E simultaneously is too high for this design to be a viable alternative.

Figure 3E:
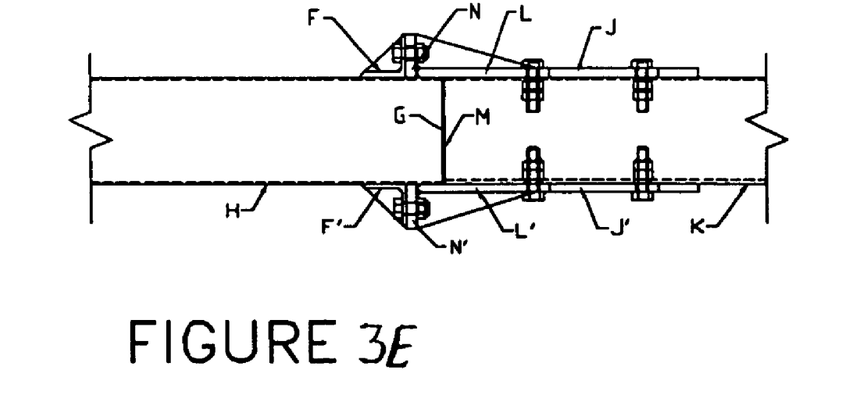
FIG. 3E shows an earlier splice mechanism for use in BEAT applications.
Figure 4A:
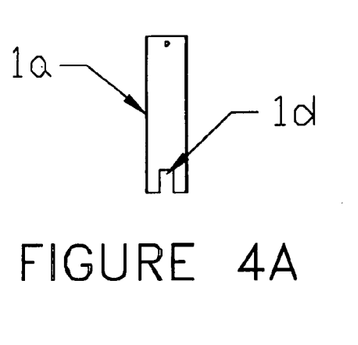
FIG. 4A is a side elevation view of the upper section of the first post in the present system.
Figures 4B, 4C, 4D:
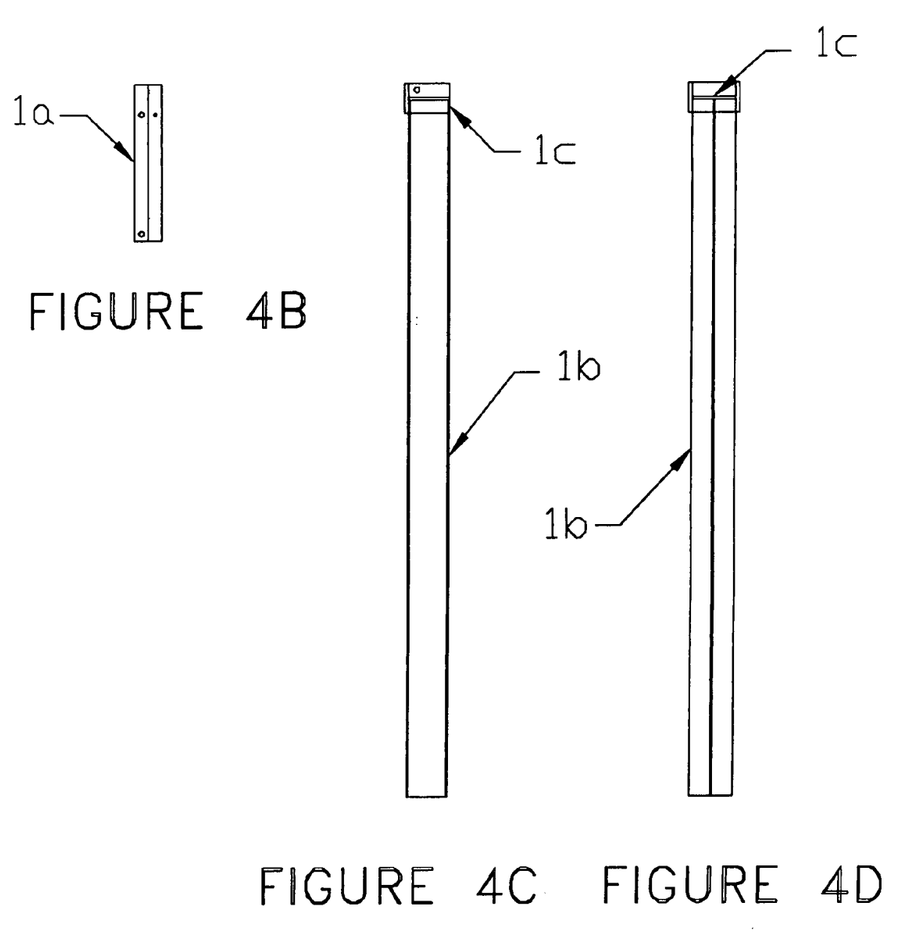
FIG. 4B is a front elevation view of the section of the post of FIG. 4A.
FIG. 4C is a front elevation view of the lower section of the first post of the present system.
FIG. 4D is a side elevation view of the section of the post of FIG. 4C.

FIG. 3E illustrates an early design for a splice mechanism for use with BEAT applications. The splice mechanism consists of two angles F and F' welded 50-mm (2 in.) for the downstream end E of the upstream tube H, one on top F and one on the bottom F'. The angles are 63.5×63.5×6.4 mm (2.5×2.5×¼ in.) in dimension and reinforced with gusset plates. Two special splice plates T and T' were used to connect the upstream tube H and the downstream tube K. The splice plates are fabricated from 13-mm (½ in.) A36 steel plates and welded together to form a L-shape reinforced with gusset plates. The overall dimensions of the splice plates are 406-mm (16 in.) long, 102-mm (4 in.) wide, and 63.5-mm (2.5 in.) high. The longer legs L and L' of the splice plates are bolted to the upstream end M of the downstream tube K with two 16-mm (⅝ in.) diameter grade 5 bolts each, again one on top and one on the bottom. The shorter legs N and N' of the splice plates on the upstream end are then bolted to the angles on the upstream tube, also with 16-mm (⅝ in.) diameter grade 5 bolts.

This initial splice mechanism requires the mandrel to shear off only two bolts at one time, thus greatly reducing the energy and associated force level. Also, the splice plates are outside of the tubers and do not interfere with the mandrel. However, the moment capacity of this splice mechanism is limited by the bolts connecting the splice plates to the angles, rendering the BEAT terminal design somewhat sensitive to redirectional type of impacts.

The present invention maintains the advantages of the early design, but provides a greater moment capacity of the splice and improving the performance of the barrier or crash system for redirectional types of impacts.

The splice mechanism of the present invention, shown in FIGS. 3A, 3B, and 3C, consists of two 464-mm (18¼-in.) long, 121-mm×51-mm×6.4-mm (4¾-in.×2-in.×¼-in.) bent plate channels 121 and 121'. The channels 121 and 121' are welded to the top and bottom of the downstream end 125 of the stage one tube for a length of 152 mm (6 in.). The upstream ends 127 and 127' of the channels are tapered to minimize the potential for snagging by the vehicle. Two 267-mm (10½-in.) long 102-mm×38-mm×7.9-mm (4-in.×½-in.×⁵⁄₁₆-in.) channel splice plates 123 and 123', again one on top and the other on the bottom, are used to connect stage one tube to the stage two tube. The channel splice plates 123 and 123' are each bolted to the upstream end 130 of the stage two tube with two 15.9-mm (⅝-in.) diameter A325 bolts 131. The channel splice plates were then bolted to the bent plate channels with 19-mm (¾-in.) diameter bolts 133.

The first post 1 in the system is a steel breakaway end post consisting of an upper section 1a and a lower section 1b (see FIGS. 4A–4D). The upper section 1a (FIGS. 4A and 4B) is a 546-mm (21½-in.) long section of standard W152×13.4 (W6×9) steel post used with W-beam guardrail systems. The lower section 1b (FIGS. 4C and 4D) is a 2438-mm (8-ft) long section of standard W152×22.3 (W6×15) steel post with a 102-mm (4-in.) wide U-shaped collar 1c welded to the top of the post. The upper post 1a is bolted to the collar 1c of the lower post 1b using a 15.9-mm (⅝-in.) diameter A325 bolt. A 23-mm (1¼-in.) wide, 82-mm (3¼-in.) long slot 1d (FIG. 4A) is cut through the web of the upper post at the bottom to allow attachment of one end of the cable anchor. The box-beam rail is attached to the end post using an angle support bracket with 7.9-mm (⁵⁄₁₆-in.) diameter A307 bolts.

Figure 5:
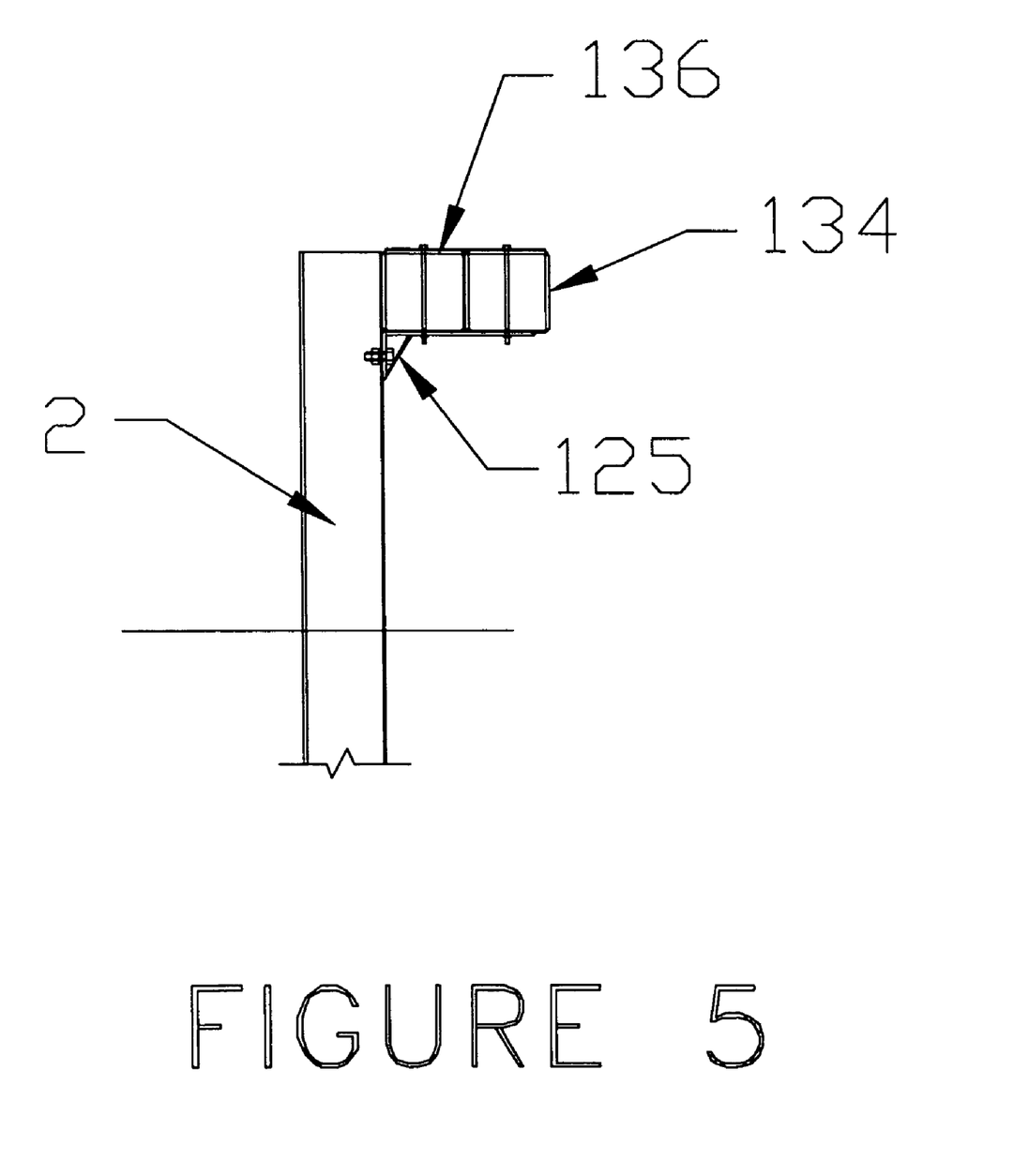
FIG. 5 is a front elevation plan view of posts 2 through 5 of the energy absorption system of the present invention.

Post nos. 2 through 6 are standard 1829-mm (6-ft) long breakaway steel posts (see FIG. 5). The rail elements 134 are attached to support brackets 135 with 7.9-mm (⁵⁄₁₆-in.) diameter bolts. The support bracket 135 is fabricated from 4.8-mm (³⁄₁₆-in.) thick bent plate and reinforced with gusset plates. The 152-mm (6-in.) long 152-mm×152-mm×4.8-mm (6-in.×6-in.×³⁄₁₆-in.) box-beam rail sections 136 are welded to the support brackets to serve as blockout tubes to the posts, as shown in FIG. 5. The support brackets are in turn attached to the posts with 15.9-mm (⅝-in.) diameter bolts. The post spacing between post nos. 1 and 2 is 1981 mm (6 ft-6 in.), and the post spacing from post nos. 2 to post 6 is 1219 mm (4 ft).

Figure 6:
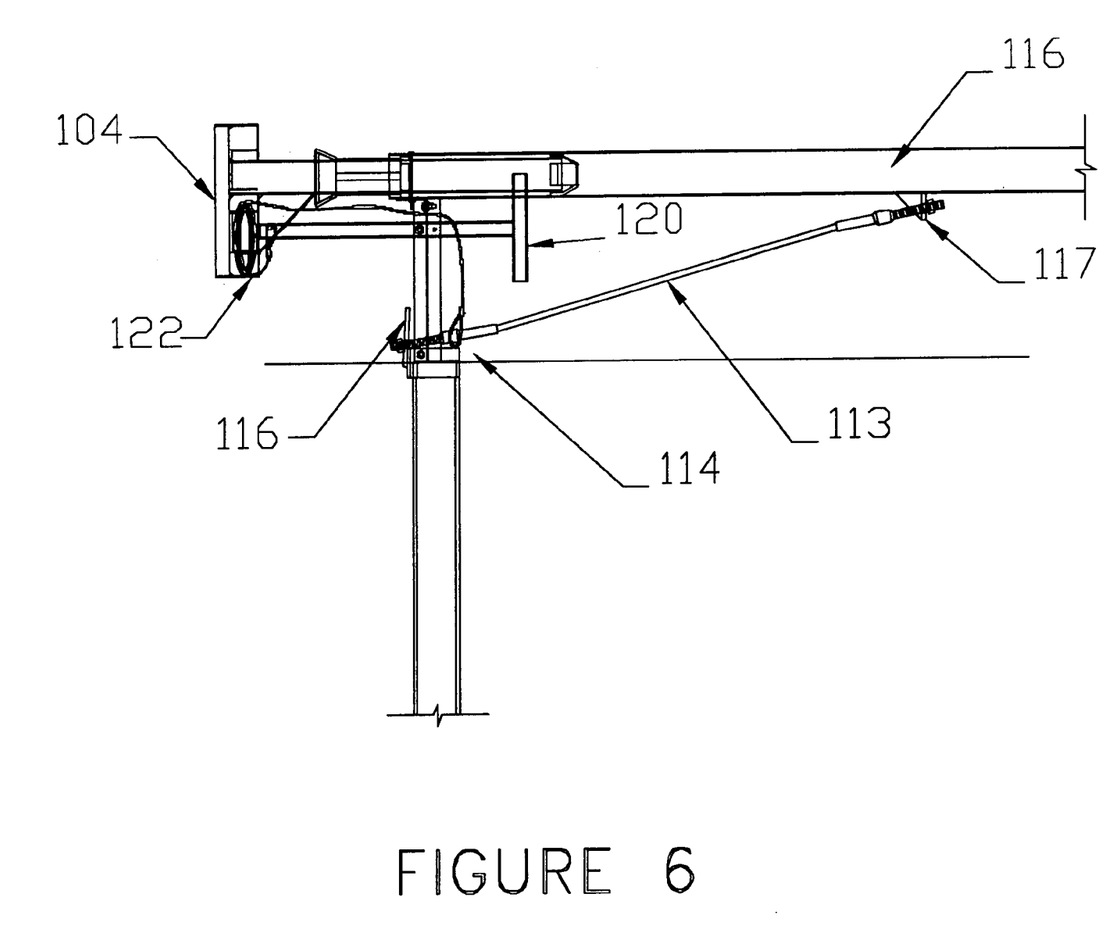
FIG. 6 is a side elevation plan view of post 1 of the present system with the impact head, post breaker, mandrel and anchor system.

Turning to FIG. 6, it may be seen that a cable anchor assembly 114 is used to transmit the force from the box-beam rail element 116 to the end post 1. The cable 117 is anchored to the end post 1 through a hole in the base of the upper section 1a of the end post and attached with a cable anchor bearing plate 116, washer, and nut. The other end of the cable is attached to the cable anchor bracket 119 on the bottom of the box-beam rail 116 with washer and nut. Unlike many existing energy-absorbing terminals, there was no need for a mechanism to release the cable anchor assembly 114 from the rail 116 since the rail is bursted into four strips.

A post breaker 115, as shown in FIG. 6, is fabricated from 51-mm×51-mm×5.4-mm (2-in.×2-in.×¼-in.) tubes. The post breaker is attached to the end post using a 19-mm (¾-in.) diameter A325 bolt. A second 6.4-mm (¼-in.) diameter bolt is also used to keep the post breaker from rotating. The post breaker is designed to facilitate the separation of the upper section 1a from the lower section 1b of the end post 1 by either shearing the attachment bolt or tearing the metal above the attachment bolt in the collar. The post breaker 115 is designed to function for both head-on impacts as well as reverse direction impacts into the side of the terminal. In head-on impacts, the impacting vehicle pushes the impact head 104 into the upstream end of the post breaker 115. For side impacts into the terminal in the reverse direction, the impacting vehicle directly contacts the post breaker 115 at its downstream end.

The 6096-mm (20-ft) long by 6.4-mm (¼-in.) diameter steel cable 122 is used to retain the impact head 104 in case of a reverse direction impact. One end of the cable 122 is attached to the impact head and the other end of the cable is attached to the upstream end of the anchor cable 117 at the end post. The cable 122 is bundled and tied to the impact head to eliminate dangling of the cable.

Shielding of the bridge piers is provided by a tubular envelope or frame 106, as shown in FIGS. 1A, 1B, 2A, and 2B. The tubular frame was modular in nature. The design will handle any number, size, and spacing of bridge piers. Earlier prototypes of the present invention concentrated on a tubular frame that was 1,829-mm (72-in.) wide and butted up directly against a 1,219-mm (48-in.) square bridge pier. As discussed above, based on observations of snagging of the engine hood and fender on the bridge pier during the initial crash tests, the tubular frame of the system was significantly and uniquely redesigned. The redesigned tubular frame was widened to 2,540 mm (100 in.) in order to reduce the potential for snagging of the engine hood and fender on the bridge pier. Increasing the width of the frame allowed for an at least 203-mm (8-in.) gap G between the envelope 106 and a 1,219-mm (48-in.) square bridge pier 105. This 8 inch gap was quite effective. It should be understood that a gap of greater than ½" may be effective in reducing snagging, but having the frame abutting against the pier is not recommended. A preferred gap range may be approximately 5 inches to 10 inches.

As shown in FIGS. 2A and 2B, the major components of the tubular frame 106 are as follows:
  (a) a double rail section 110 or 110' at bridge pier;
  (b) a connecting rail section 112 or 112';
  (c) an angled end strut 114 or 114'; and
  (d) a Y-shape connector 116 or 116'.
  (e) a frame cable anchorage 118 or 118'.

The tubular frame forms an envelope 106 around the bridge piers. For each bridge pier, there is a double rail section 110 and 100' on each side. The double rail sections are joined by connecting rail sections 112 and 112' to form a continuous rail in front the bridge piers. Again remember that more than one double rail section maybe used. The two rails are then joined by angled struts 114 or 114' on both ends to form a parallelogram. This may readily be seen in FIG. 1A. The end struts 114 are angled so that errant vehicles that go behind the crash cushion will not impact the end strut at a right angle. Instead, the angled strut is intended to redirect the vehicle away from the bridge piers.

The double rail sections 110 and 110', as shown in FIGS. 1A, 1B and 2A, are placed laterally in front of and spaced apart (by gap G) from each bridge pier. As previously stated, the gap G should be at least ½" from the face of the pier. The front rail section 130 is 4940-mm (12-ft 2½-in.) long, and the extended block rail section 132 is 3048-mm (10-ft) long. Both sections are fabricated from TS 152-mm×152-mm× 4.8-mm (6-in.×6-in.×³⁄₁₆-in.) structural tubing. The two rail sections are held together by bolting the sections between a special support bracket on the bottom and tie plates on top with 7.9-mm (⁵⁄₁₆-in.) diameter bolts. The support brackets, fabricated from a 4.8-mm (³⁄₁₆in.) thick bent plate and reinforced with gusset plates, are in turn attached to the posts with 15.9-mm (⅝ in.) diameter bolts. Each double rail section has four standard 1829 mm (6 ft.) long, W152×13.4 (W6×9) guardrail line posts (posts 9 through 12 shown in FIGS. 2A and 2B).

The double rail sections 110 at the bridge piers are joined with connecting rail sections 113 and 113', also fabricated from TS 152-mm×152-mm×4.8-mm (6-in.×6-in.×³⁄₁₆-in.) structural tubing. The length of the connecting rail sections may vary, depending on the spacing between the bridge piers. Standard box-beam rail splice plates 110 are used to join the rail sections. Each connecting rail section has one or more supporting posts (post nos. 13 and 14 shown in FIG. 2A). These posts are standard 1829-mm (6-ft) long, W152× 13.4 (W6×9) guardrail line posts. The same support brackets with box-beam rail blockouts or extended blockout support brackets and tie plates are used for attaching the rail section to the posts. The post spacing for the posts in the connecting rail section was 914 mm (3 ft).

The two sides of the envelope 106 rails are joined by angled struts 114 and 114' on both ends to form a parallelogram. The angle has been selected to be approximately 34 degrees. The angled strut is connected to the back rail with a bent splice 134 or 134'. The bent splice is fabricated from welding two short sections of TS 127-mm×127-mm×4.8-mm (5-in.×5-in.×³⁄₁₆-in.) structural tubing together. The welded end of each section have an angle of approximately 17 degrees for a total of approximately 34 degrees. The length on the short side of the section is 328 mm (12.9 in.). The angled strut 114 is attached to the front rail section 112 or 112' and the stage two energy-absorbing tube 103 of the crash cushion with a Y connector 116 or 116'.

Figure 7:
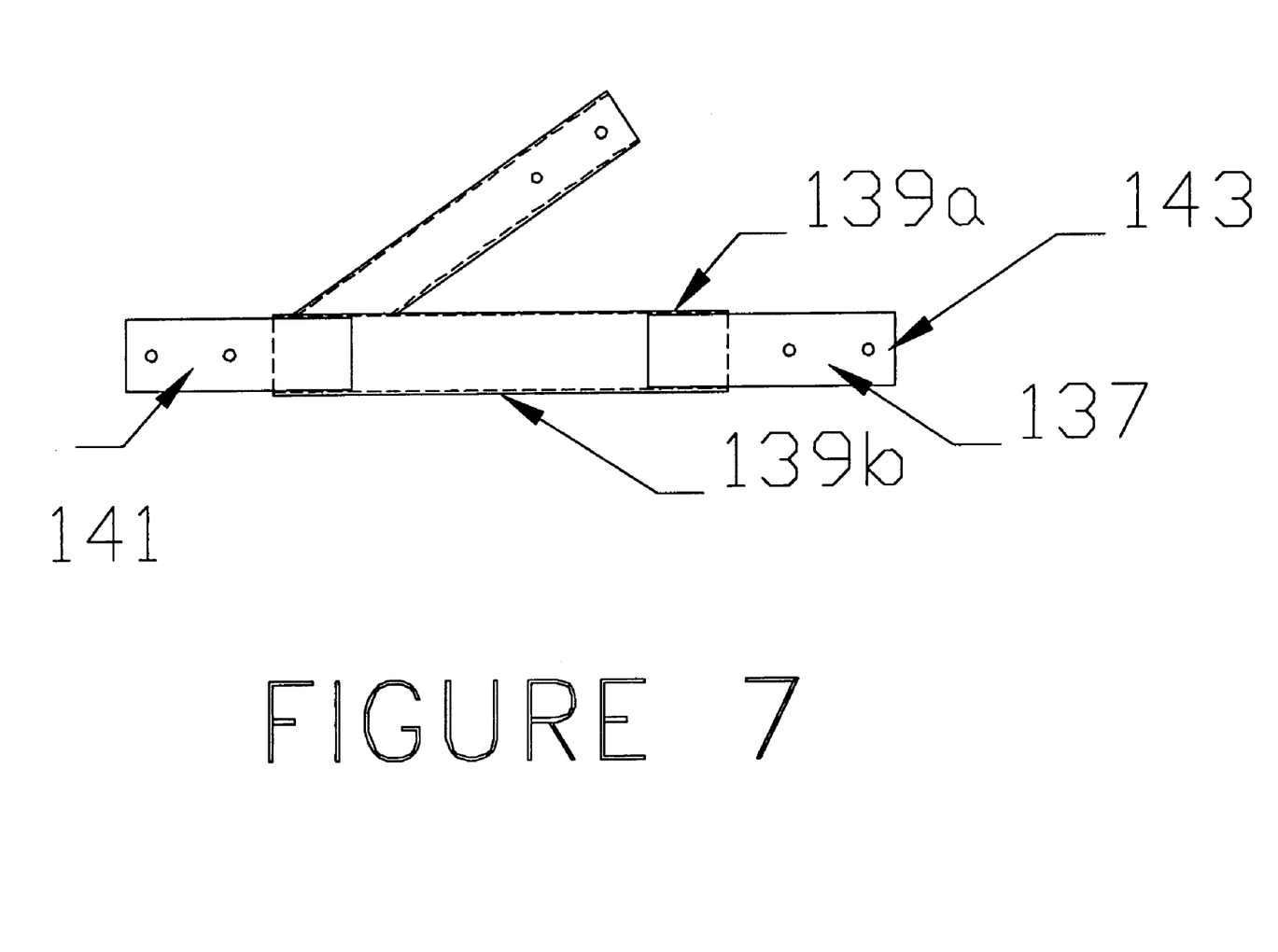
FIG. 7 is a top plan view of the Y-connection of the present system.

The Y connector 116, as shown in FIG. 7, consists of a 292-mm (11½-in.) long, TS 152-mm×152-mm×4.8-mm (6-in.×6-in.×³⁄₁₆-in.) center tube 137. Two 948-mm×102-mm×12.7-mm (37-in. ⁴⁄₁₆-in×4×½-in.) splice plates 139a are welded to the top and bottom of the center tube 137. The stage two energy-absorbing tube from the crash cushion is attached to the upstream end 141 of the splice plates and the double rail section is attached to the downstream end 143. A TS 114-mm×114-mm×4.8-mm (4½-in.×4½-in.×³⁄₁₆-in.) structural tubing 142 with a length of 357 mm (14 in.) on the short side is welded to one side of the center tube at an angle of 34 degrees and for bolting of the angled end strut 114 or 114'.

Anchorage for the tubular frame is provided by a pair of cable anchorage 118 and 118'. The cable anchors are located inside of the tubular frame and attach to the box-beam rail 132 260-mm (10¼-in.) downstream of post no. 10 (FIGS. 2A and 2B) in order to provide the necessary capacity upstream of the end terminals for impacts on the terminal ends of the system. As may be seen in detail (FIG. 2C), the additional anchorages consist of the same lower end post 150 used on the end terminal anchorages, a steel cable 152, and an anchor bracket 154 mounted underneath the box-beam rail. The lower end post 150 is a 2438-mm (8-ft) long section of standard W152×22.3 (W6×15) steel post with a 102-mm (4-in.) wide U-shaped collar 153 welded to the top of the post. A 31.75-mm diameter hole is drilled in the U-shaped collar in order to attach the cable 152. The other end of the cable is attached to a cable anchor bracket 154 on the bottom of the box-beam rail with washer and nut. The cable anchor bracket 154 consists of a 12.7-mm (½-in.) thick plate 155 with a 30-mm (1⅛-in.) diameter hole for the cable anchor and reinforced with gussets.

The overall system shown in the FIGS. 2A and 2B has two 1219-mm (48-in.) square bridge piers spaced 6096 mm (20 ft) apart. For different number of bridge piers, each bridge pier is shielded by the double rail system with the four supporting posts. The double rail sections are then joined by connecting rail sections to form a continuous rail. The standard setup accommodates bridge pier sizes of up to 1219-mm (48-in.) square, which is generally adequate for most situations. For larger bridge piers, the structural frame may be customized to accommodate the specific size of the bridge pier. Finally, different spacing between the bridge piers may be accommodated by adjusting the length of the connecting rail sections.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A crash cushion system to envelop at least one bridge pier comprising:
   first and second impact heads;
   a first box-beam rail energy absorption mechanism attached at a first end to said first impact head;
   a second box-beam rail energy absorption mechanism attached at a first end to said second impact head; and
   a non-rectangular, parallelogram shaped pier frame having two interior angles greater than 90° surrounding said at least one bridge pier piling, said frame comprising:
      a first side spaced apart from and extending laterally adjacent one side of said at least one bridge pier piling and connected at one end to said first box-beam rail energy absorption mechanism;
      a second side spaced apart from and extending laterally adjacent an opposite side of said at least one bridge pier piling and connected at one end to said second box-beam rail energy absorption mechanism.

2. The system of claim 1 further comprising:
   first and second cable anchorage mechanism within said frame, said first anchorage mechanism connected to said first side of said frame and said second anchorage mechanism connected to said second side of said frame.

3. The system of claim 1 or 2 wherein said frame further comprises:
   a first Y-shaped connector attached at one end to said first box-beam rail energy absorption mechanism, said first connector having a first leg and a second leg, said first side of said frame connected to said first leg of said first connector and said second side of said frame connected to said second leg of said first connector; and
   a second Y-shaped connector attached at one end to said second box-beam rail energy absorption mechanism, said second connector having a first leg and a second leg, said second side of said frame connected to said first leg of said second connector and said first side of said frame connected to said second leg of said section connector.

4. The system of claim 1 or 2 wherein a portion of said first side of said frame has a first double rail section and a portion of said second side of said frame has a second double rail section.

5. The system of claim 4 wherein said frame further comprises:
   a first angled end strut spliced to said first double rail section; and
   a second angled end strut spliced to said second double rail section.

6. The system of claim 1 or 2 wherein said first and second sides of said frame are each spaced apart approximately 5 inches to approximately 10 inches from said at least one bridge pier piling.

7. The system of claim 1 or 2 wherein said first box-beam rail energy absorption mechanism further comprising:
   a first stage energy absorber attached at a first end to said first impact head;
   a box-beam rail splice member attached to a second end of said first stage absorber; and
   a downstream, second stage energy absorber attached at a first end to said splice member.

8. A crash cushion system to envelop at least one bridge pier piling comprising:
   a first and a second impact head;
   a first multi-stage energy absorption mechanism attached at a first end to said first impact head and a second multi-stage energy absorption mechanism attached at a first end to said second impact head, each of said multi-stage mechanisms comprising:
      a first stage box-beam energy absorber attached at a first end to one of said impact heads; and
      a downstream, second stage box-beam energy absorber spliced at a first upstream end to said first stage energy absorber; and
   a parallelogram shaped tubular pier frame surrounding said at least one bridge pier piling, said frame comprising:
   a first Y-shaped connector attached at an upstream end to said first multi-stage energy absorption mechanism, said first Y-shaped connector having a first leg and a second leg;
   a first box-beam connector tube section attached at one end to said first leg of said first Y-shaped connector;
   a first double rail section attached at an upstream end to a second downstream end of said first connector tube section, said first double rail section spaced apart from and positioned laterally adjacent to one side of said at least one bridge pier piling;
   a first angled end strut having a first end and a second end and spliced at said first end to a downstream end of said first double rail section;
   a second Y-shaped connector attached at one end to said second multi-stage energy absorption mechanism, said second connector having a first leg and a second leg, said second end of said first angled end strut connected to said second leg of said second Y-shaped connector;
   a second box-beam connection tube section attached at one end to said first leg of said second Y-shaped connector;
   a second double rail section attached at one end to a second end of said section connection tube, said second double rail section spaced apart from and positioned laterally adjacent to an opposite side of said at least one bridge pier piling;
   a second angled end strut spliced at one end to a second end of said second double rail section and connected at a second end to said second leg of said first Y-shaped connector; and
   first and second cable anchorage mechanisms within said parallelogram shaped frame, said first anchorage mechanism connected to said first double rail section and said second anchorage mechanism connected to said second double rail section.

9. The system of claims 1, 2 or 8 further comprising:
   an end splice assembly for a box-beam guardrail and terminal system having a first stage energy adsorption rail element and a second stage energy absorption rail element comprising:
   a first bent plate channel attached to a first side of a downstream end of said first stage element and extending a length beyond said downstream end of said first element, said first bent plate channel having an upper wall and two spaced apart perpendicularly depending side walls.
   a second bent plate channel attached to a second, opposite, side of said downstream end of said first stage element and extending said length beyond said downstream end of first stage element, said second bent plate channel having an upper wall and two spaced apart perpendicularly depending side walls;
   a first channel splice plate attached to a first side of an upstream end of said second stage element, said first channel splice plate having a bottom wall and two spaced apart perpendicularly depending side walls;
   a second channel splice plate attached to a second, opposite, side of said upstream end of said second stage element, said second channel splice plate having a bottom wall and two spaced apart perpendicularly depending side walls;
   said first and second channel splice plate perpendicularly extending side walls adopted to be received between said spaced part perpendicularly depending side walls of said first and second bent plate channels when said first stage element and said second stage element are abutted at said upstream and downstream ends; and
   fastener members to attach said first bent plate channel to said first channel splice plate and to attach said second bent plate channel to said second channel splice plate when said channel splice plates are received between said bent plate channels.

* * * * *